United States Patent
Prochazka et al.

(10) Patent No.: US 10,161,177 B1
(45) Date of Patent: Dec. 25, 2018

(54) ANTI-PINCH MOONROOF AND ASSOCIATED METHOD

(71) Applicant: Ford Global Technologies, LLC, Dearborn, MI (US)

(72) Inventors: Bradley Mark Prochazka, Livonia, MI (US); David Lee Jarvis, Madison Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/789,502

(22) Filed: Oct. 20, 2017

(51) Int. Cl.
  *B60J 7/043*   (2006.01)
  *E05F 15/73*   (2015.01)
  *E05F 15/655*  (2015.01)

(52) U.S. Cl.
  CPC .............. *E05F 15/73* (2015.01); *B60J 7/043* (2013.01); *E05F 15/655* (2015.01); *E05Y 2201/434* (2013.01); *E05Y 2400/354* (2013.01); *E05Y 2900/542* (2013.01)

(58) Field of Classification Search
  CPC . E05F 15/73; E05F 15/74; E05F 15/77; E05F 15/78; E05F 15/765; E05F 2015/765; E05Y 2900/542
  USPC .......................... 296/216.01–224; 49/26, 28; 224/309–310, 321–323, 325–326, 224/329–331
  See application file for complete search history.

(56) References Cited

U.S. PATENT DOCUMENTS

| | | | | |
|---|---|---|---|---|
| 4,048,662 A | * | 9/1977 | Burguburu | B60J 7/0573 296/223 |
| 4,561,691 A | * | 12/1985 | Kawai | B60J 7/0573 296/216.04 |
| 4,911,348 A | * | 3/1990 | Rasor | B60R 9/045 224/321 |
| 5,592,060 A | | 1/1997 | Racine et al. | |
| 5,592,777 A | * | 1/1997 | Petri | E05F 15/443 296/223 |
| 5,730,343 A | * | 3/1998 | Settelmayer | B60R 9/045 224/321 |
| 5,984,155 A | * | 11/1999 | Stapleton | B60R 9/045 224/321 |
| 6,186,586 B1 | * | 2/2001 | Lindinger | B60J 10/82 296/214 |
| 6,315,355 B1 | * | 11/2001 | Lamm | B60J 7/053 296/213 |
| 6,404,158 B1 | | 6/2002 | Boisvert et al. | |
| 6,430,872 B1 | | 8/2002 | Fin | |
| 6,561,397 B1 | * | 5/2003 | Bauer | B60R 9/04 224/316 |

(Continued)

FOREIGN PATENT DOCUMENTS

DE  19755110 A1  12/1997
DE  102009038935 A1  8/2009

*Primary Examiner* — Dennis H Pedder

(74) *Attorney, Agent, or Firm* — Carlson, Gaskey & Olds, P.C.

(57) ABSTRACT

A motor vehicle according to an exemplary aspect of the present disclosure includes, among other things, a moonroof, a roof rail, a wire adjacent the roof rail, and a roof rack selectively attachable to the roof rail. The roof rack includes a magnet. Further, the vehicle includes a controller configured to deactivate the moonroof when a current flowing through the wire is disturbed by the magnet. A method is also disclosed.

18 Claims, 3 Drawing Sheets

(56) References Cited

U.S. PATENT DOCUMENTS

| | | | |
|---|---|---|---|
| 6,678,601 B2 * | 1/2004 | Whinnery | G05B 19/232 |
| | | | 160/1 |
| 7,000,982 B2 | 2/2006 | Kreiner et al. | |
| 7,762,624 B2 * | 7/2010 | Faerber | B60J 7/0046 |
| | | | 296/223 |
| 7,905,531 B2 * | 3/2011 | Park | B60R 9/058 |
| | | | 224/309 |
| 7,905,543 B2 * | 3/2011 | Ito | E05F 15/431 |
| | | | 296/155 |
| 9,278,610 B2 * | 3/2016 | Nania | B60J 7/0573 |
| 9,393,911 B2 * | 7/2016 | Pfeiffer | B60R 9/058 |
| 2005/0184562 A1 | 8/2005 | Truol et al. | |
| 2009/0211156 A1 * | 8/2009 | Appel | E05F 15/46 |
| | | | 49/28 |
| 2011/0297713 A1 * | 12/2011 | Gisin | B60R 9/04 |
| | | | 224/327 |

* cited by examiner

ANTI-PINCH MOONROOF AND ASSOCIATED METHOD

TECHNICAL FIELD

This disclosure relates to a motor vehicle having an anti-pinch moonroof and an associated method. In particular, this disclosure relates to a motor vehicle having anti-pinch control scheme preventing undesired contact between a moonroof and a roof rack.

BACKGROUND

Motor vehicles are known to include moonroofs, which are transparent sections in the roof of a motor vehicle. Typically, the transparent section is provided by one or more transparent panels, which are fixed or moveable. In some example, the panels are moveable to expose an opening in the roof, which allows light and fresh air to enter the passenger cabin.

Some motor vehicles also include roof racks, which attach to roof rails on the roof of the motor vehicle. When cabin space is limited, for example, users can store luggage on the roof of the vehicle by attaching the luggage to the roof racks.

SUMMARY

A motor vehicle according to an exemplary aspect of the present disclosure includes, among other things, a moonroof, a roof rail, a wire adjacent the roof rail, and a roof rack selectively attachable to the roof rail. The roof rack includes a magnet. Further, the vehicle includes a controller configured to deactivate the moonroof when a current flowing through the wire is disturbed by the magnet.

In a further non-limiting embodiment of the foregoing vehicles, the controller is configured to direct a baseline current through the wire, and the controller is configured to detect a disturbance when the current flowing through the wire deviates from the baseline current by a predetermined amount.

In a further non-limiting embodiment of any of the foregoing vehicles, a magnetic field of the magnet disturbs the current flowing through the wire when the roof rack is attached to the roof rail.

In a further non-limiting embodiment of any of the foregoing vehicles, the roof rack includes a clamp and a cross bar, and the clamp is configured to selectively attach to the roof rail.

In a further non-limiting embodiment of any of the foregoing vehicles, the clamp includes the magnet.

In a further non-limiting embodiment of any of the foregoing vehicles, the wire spans substantially the entire length of the roof rail, and the roof rack is infinitely adjustable such that the clamp can be selectively attached to the roof rail at any point along the length of the roof rail.

In a further non-limiting embodiment of any of the foregoing vehicles, the magnet is a rare earth magnet.

In a further non-limiting embodiment of any of the foregoing vehicles, the moonroof includes a plurality of panels.

In a further non-limiting embodiment of any of the foregoing vehicles, at least one of the plurality of panels is selectively moveable by a motor, and the controller deactivates the motor when the current flowing through the wire is disturbed by the magnet.

In a further non-limiting embodiment of any of the foregoing vehicles, the wire is located beneath at least one of the panels.

In a further non-limiting embodiment of any of the foregoing vehicles, the wire is located beneath a roof surface adjacent the roof rack and adjacent a panel of the moon roof.

A method according to an exemplary aspect of the present disclosure includes, among other things, deactivating a moonroof when a disturbance is detected in a current flowing through a wire. The disturbance is generated by a magnet of a roof rack.

In a further non-limiting embodiment of the foregoing method, the current flowing through the wire is a baseline current, and a controller detects a disturbance when the current flowing through the wire deviates from the baseline current by a predetermined amount.

In a further non-limiting embodiment of any of the foregoing methods, the wire is adjacent a roof rail, and the wire spans substantially an entire length of the roof rail.

In a further non-limiting embodiment of any of the foregoing methods, a clamp of the roof rack includes the magnet.

In a further non-limiting embodiment of any of the foregoing methods, the roof rack is infinitely adjustable such that the clamp can be selectively attached to the roof rail at any point along the length of the roof rail, and the deactivating step can be performed when the roof rail is attached at any point along the length of the roof rail.

In a further non-limiting embodiment of any of the foregoing methods, the magnet is a rare earth magnet.

In a further non-limiting embodiment of any of the foregoing methods, the moonroof includes a plurality of panels.

In a further non-limiting embodiment of any of the foregoing methods, at least one of the panels is selectively moveable by a motor, and wherein a controller deactivates the motor when the disturbance is detected.

DETAILED DESCRIPTION

This disclosure relates to a motor vehicle having an anti-pinch moonroof and an associated method. In particular, this disclosure relates to a motor vehicle having an anti-pinch control scheme, which prevents undesired contact between a moonroof and a roof rack.

One example motor vehicle according to this disclosure includes a moonroof and a roof rail. The vehicle further includes a wire adjacent the roof rail. The vehicle includes a roof rack, which is selectively attachable to the roof rail and includes a magnet. When positioned adjacent the wire, the magnet generates a disturbance in a current flowing through the wire. The vehicle includes a controller configured to deactivate the moonroof when that disturbance is detected. In this way, the moonroof functionality is disabled when the roof rack is present.

This arrangement provides many benefits, including allowing for a low profile roof rack, which improves the aerodynamic properties of the vehicle, while also providing a reliable anti-pinch control scheme that detects the roof rack regardless of the position of the roof rack relative to the roof rail.

Figure 1:
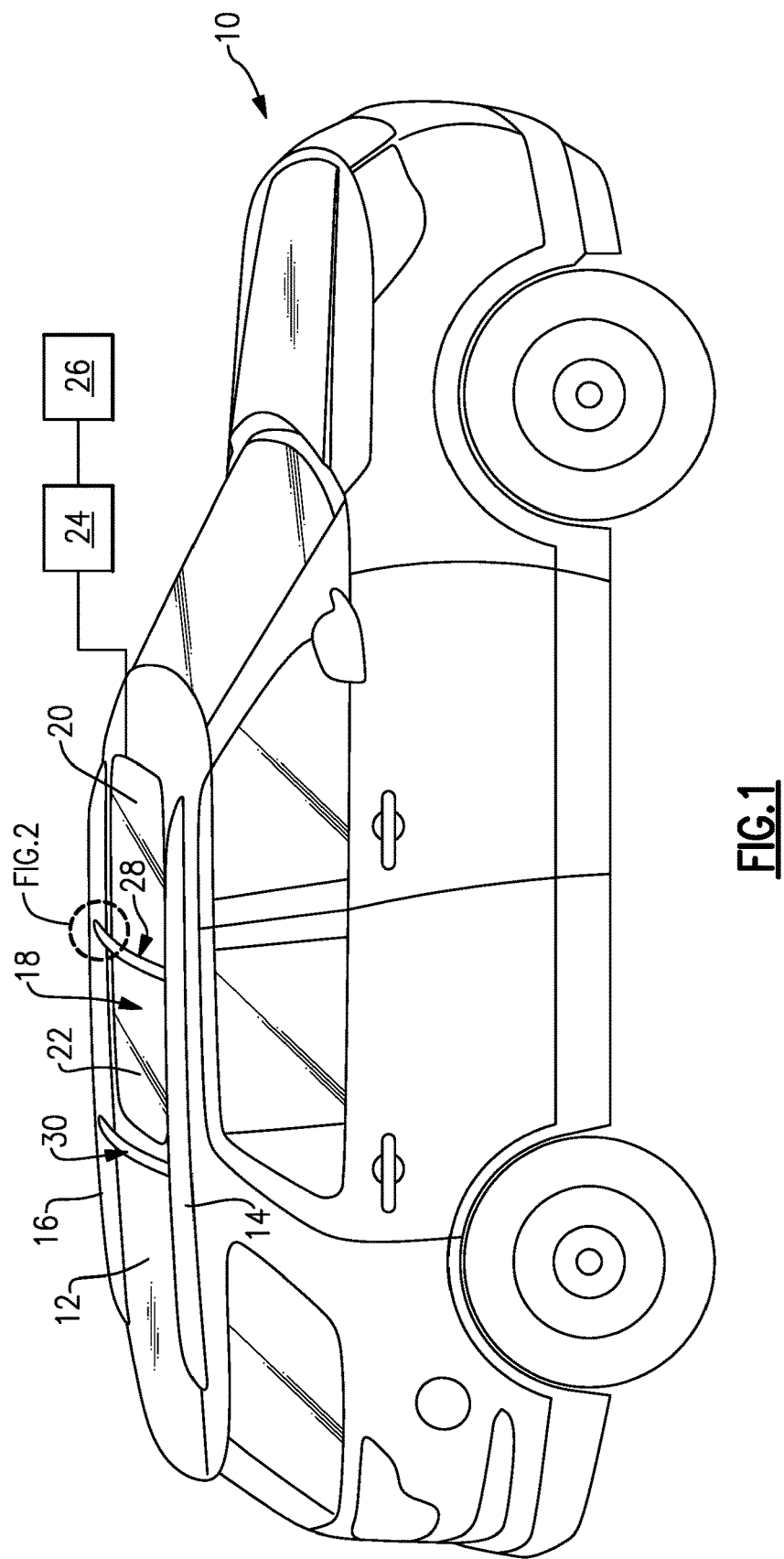
FIG. 1 is a side view of a motor vehicle with a moonroof and a roof rack.

Referring to the drawings, FIG. 1 is a side view of a motor vehicle 10. The motor vehicle 10 includes a roof 12 having first and second roof rails 14, 16 extending along sides of the vehicle 10, and a moonroof 18 between the first and second roof rails 14, 16. In FIG. 1, the motor vehicle 10 is a sport utility vehicle (SUV), but it should be understood that this disclosure extends to other types of vehicles.

The moonroof 18 includes a plurality of panels. In particular, the moonroof 18 includes a first panel 20 and a second panel 22. The panels 20, 22 are made of a transparent material, which in one example is glass. This disclosure is not limited to any particular material type for the panels 20, 22, however.

In FIG. 1, the moonroof 18 is closed. When closed, upper surfaces of the panels 20, 22 are substantially flush with the upper surface of the roof 12. Further, when closed, the panels 20, 22 are arranged such that the first panel 20 is forward of the second panel 22. Together, the panels 20, 22 cover an opening in the roof 12 when closed, which protects the vehicle cabin and its occupants from the outside environment.

The moonroof 18 includes moveable panels configured to selectively expose at least a portion of the opening in the roof 12. Opening the moonroof 18 exposes the vehicle cabin and its occupants to the outside environment. During periods of good weather, exposing an opening in the roof 12 can lead to increased enjoyment and an enhanced riding experience for the occupants of the vehicle.

The moonroof 18, in this example, includes a motor 24 configured to move one or more of the panels 20, 22 to open and close the moonroof 18. The motor 24 is responsive to instructions from a controller 26. The motor 24 and the controller 26 are illustrated schematically in FIG. 1. It should be understood that the controller 26 could be part of an overall vehicle control module, such as a vehicle system controller (VSC), or could alternatively be a stand-alone controller separate from the VSC. Further, the controller 26 may be programmed with executable instructions for interfacing with and operating the various components of the vehicle 10. The controller 26 additionally includes a processing unit and non-transitory memory for executing the various control strategies and modes of the vehicle system. While the motor 24 and controller 26 are shown separately, the motor 24 and controller 26 could be integrated into a combined unit in some examples.

In addition to the moonroof 18, the roof 12 of the vehicle 10 also includes first and second roof racks 28, 30. The first and second roof racks 28, 30 are selectively attached to the roof rails 14, 16 and extend across the vehicle 10. The roof racks 28, 30 are configured to support luggage or other items above the roof 12 of the vehicle 10 for transport.

When opening of the moonroof 18, one or more of the panels 20, 22 may be raised and/or tilted relative to the roof 12. When the roof racks 28, 30 are present, opening the moonroof 18 may cause the panels 20, 22 to contact, or "pinch," one or more of the roof racks 28, 30. Such contact is undesired, and may lead to damage of the moonroof 18 or the roof racks 28, 30. As such, this disclosure includes an anti-pinch control scheme, which deactivates the moonroof when a roof rack is present.

Figure 2:
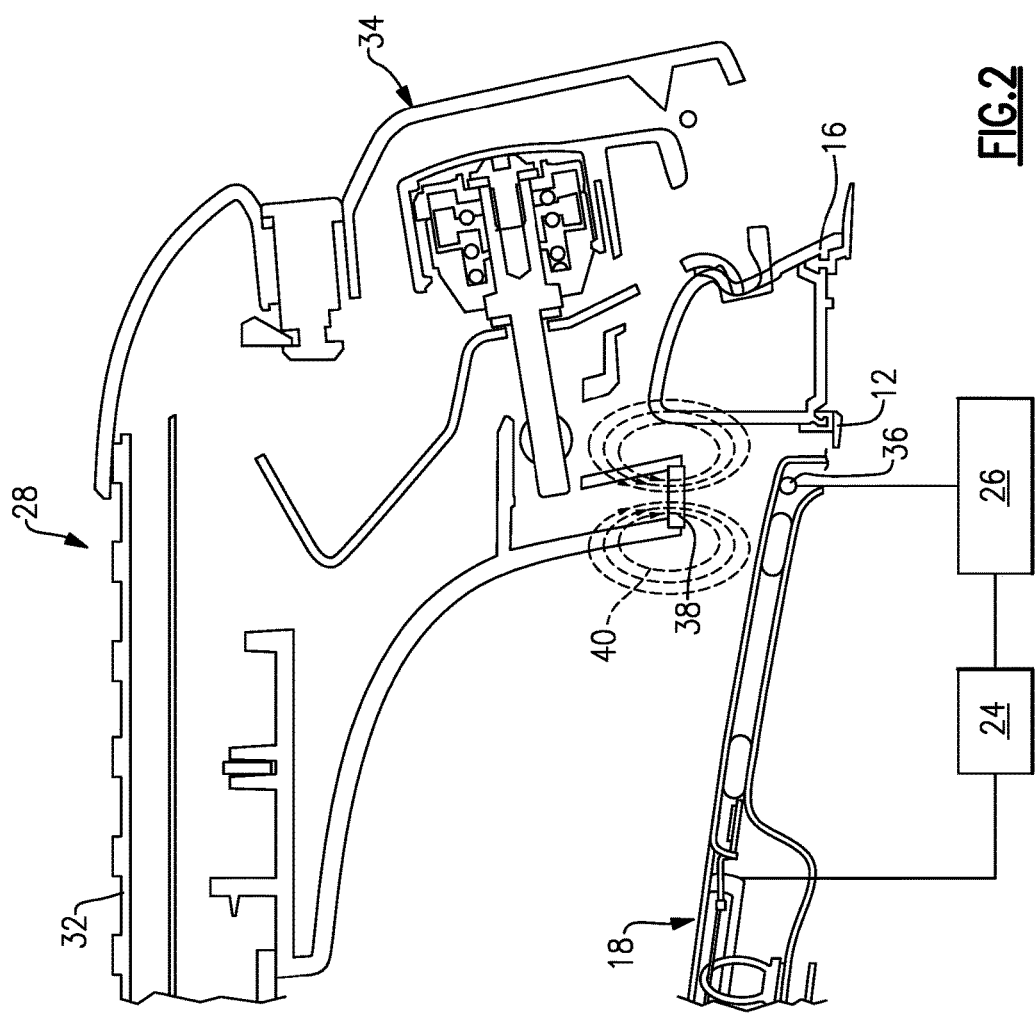
FIG. 2 is close-up, sectional view of the encircled area in FIG. 1.

FIG. 2 is a close-up, sectional view of the encircled area in FIG. 1. In particular, FIG. 2 illustrates one example arrangement between the roof 12, roof rail 16, moonroof 18, and roof rack 28. While the roof rail 14 and roof rack 30 are not illustrated in FIG. 2, it should be understood that they are arranged substantially similar to the roof rail 16 and roof rack 28.

In this disclosure, the roof rack 28 is attachable to the roof rail 16 at any point along the length of the roof rail 16. In this way, the roof rack 28 is infinitely adjustable. The roof rack 28 includes a cross bar 32 and a clamp 34 at each end of the cross bar 32. While only the clamp 34 is illustrated in FIG. 2, it should be understood that another clamp is arranged adjacent the roof rail 14. The clamp 34 is configured to selectively attach to the roof rail 16 to maintain a position of the roof rack 28 relative to the roof 12 of the vehicle 10. While a particular clamp 34 is illustrated in FIG. 2, it should be understood that this disclosure extends to other types of clamps.

The vehicle 10, and in particular the controller 26, is configured to detect the presence of the roof rack 28 when it is attached at any point along the length of the roof rail 16. In one example, the vehicle 10 includes a wire 36 adjacent the roof rail 16. The wire 36 is electrically coupled to the controller 26, and the controller 26 is configured to direct electrical current through the wire 36. The controller 26 is further configured to detect the level of current flowing through the wire 36. The wire 36 spans substantially the entire length of the roof rail 16. In this example, the wire 36 is located interiorly of the roof rail 16, and is positioned between the roof rail 16 and the moonroof 18. The wire 36 may extend beneath paneling of the roof 12 of the vehicle 10, beneath paneling of the moonroof 18 (i.e., beneath one or more of the panels 20, 22), or both. The wire 36 can be provided in other locations. Further, it should be understood that another wire similar to the wire 36 may be provided adjacent the roof rail 14.

The roof rack 28 includes a magnet 38, which in one example is a rare earth magnet, configured to generate a magnetic field 40 (represented in phantom). The magnet 38, in this example, is located on an interior side of the clamp 34 such that the magnet 38 is vertically above the wire 36 when the roof rack 28 is attached to the roof rail 16. The magnet 38 could be located elsewhere on the roof rack 28 in other examples. Together, the wire 36 and magnet 38 allow the controller 26 to determine if a roof rack is present, and, if so, to deactivate the moonroof.

Figure 3:
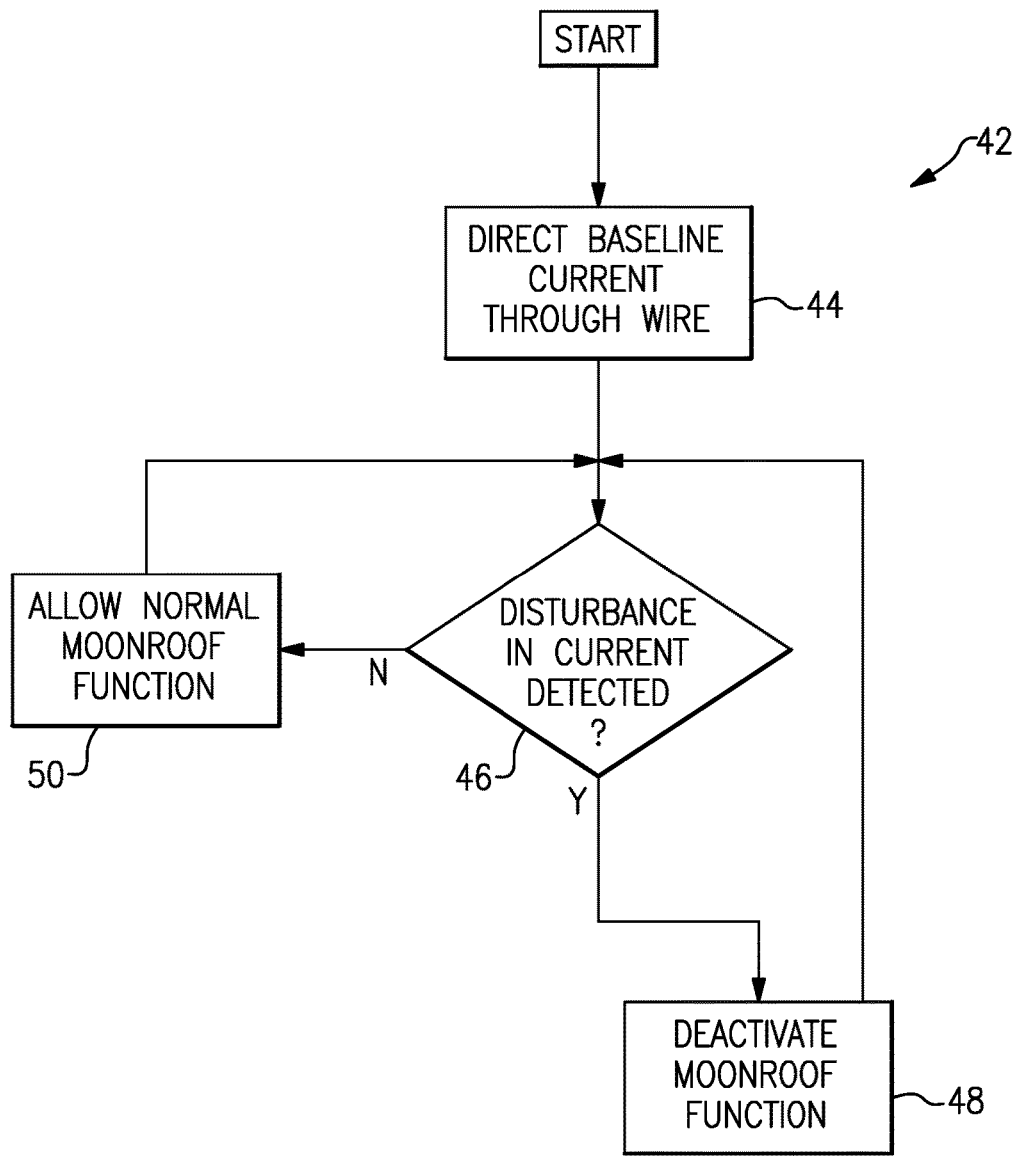
FIG. 3 is a flow chart representative of a method according to this disclosure.

FIG. 3 is a flow chart representative of a method 42 according to this disclosure. In particular, FIG. 3 represents the anti-pinch control scheme of the present disclosure. With joint reference to FIGS. 2 and 3, the method 42 begins at 44 with the controller 26 directing a baseline level of current through the wire 36. The baseline level of current is a predetermined level of current, and is used by the controller 26 as a reference point throughout the method 42. The baseline level of current is a relatively low current level, while at the same time being high enough such that deviations in the baseline level of current are readily detectable.

At 46, the controller 26 determines whether there has been a disturbance in the baseline level of current. In one example, a disturbance is defined as a deviation (including an increase or decrease) from the baseline level of current greater than a predetermined amount. By setting a predetermined amount, the controller 26 will not deactivate the moonroof 18 when there are minor disturbances in the baseline level of current, such as those that may be caused by snow or ice accumulation on the roof 12, as examples. To this end, the predetermined amount corresponds to an expected current disturbance that will be generated by the magnet 38.

When the roof rack 28 is attached to the roof rail 16, the magnetic field 40 causes a disturbance in the current flowing through the wire 36, and specifically causes the current flowing through the wire 36 to deviate from the baseline level by an amount that exceeds the predetermined amount. Thus, when the roof rack 28 is attached to the roof rail 16, a disturbance is detected, and the controller 26 deactivates (i.e., disables) the function of the moonroof 18, at 48. That is, the controller 26 instructs the motor 24 to cease, and the panels 20, 22 of the moonroof 18 are prevented from moving. In this way, the moonroof 18 will not contact (or "pinch") the roof rack 28. On the other hand, if the roof rack 28 is not attached to the roof rail 16, then no disturbance is detected, and normal moonroof function is allowed, at 50.

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component or arrangement.

It should be understood that terms such as "about," "substantially," and "generally" are not intended to be boundaryless terms, and should be interpreted consistent with the way one skilled in the art would interpret those terms. Further, directional terms such as "above," "below," "forward," "rearward," "inside," "outside," "vertical," "top," "bottom," and "interiorly" are used with reference to an normal operational attitude of a motor vehicle, and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a moonroof;
a roof rail;
a wire adjacent the roof rail;
a roof rack selectively attachable to the roof rail, wherein the roof rack includes a magnet; and
a controller configured to deactivate the moonroof when a current flowing through the wire is disturbed by the magnet.

2. The motor vehicle as recited in claim 1, wherein the controller is configured to direct a baseline current through the wire, and wherein the controller is configured to detect a disturbance when the current flowing through the wire deviates from the baseline current by a predetermined amount.

3. The motor vehicle as recited in claim 1, wherein, when the roof rack is attached to the roof rail, a magnetic field of the magnet disturbs the current flowing through the wire.

4. The motor vehicle as recited in claim 1, wherein the roof rack includes a clamp and a cross bar, wherein the clamp is configured to selectively attach to the roof rail.

5. The motor vehicle as recited in claim 4, wherein the clamp includes the magnet.

6. The motor vehicle as recited in claim 4, wherein the wire spans substantially the entire length of the roof rail, and wherein the roof rack is infinitely adjustable such that the clamp can be selectively attached to the roof rail at any point along the length of the roof rail.

7. The motor vehicle as recited in claim 1, wherein the magnet is a rare earth magnet.

8. The motor vehicle as recited in claim 1, wherein the moonroof includes a plurality of panels.

9. The motor vehicle as recited in claim 8, wherein at least one of the plurality of panels is selectively moveable by a motor, and wherein the controller deactivates the motor when the current flowing through the wire is disturbed by the magnet.

10. The motor vehicle as recited in claim 9, wherein the wire is located beneath at least one of the panels.

11. A method, comprising:
deactivating a moonroof when a disturbance is detected in a current flowing through a wire, the disturbance generated by a magnet of a roof rack.

12. The method as recited in claim 11, wherein the current flowing through the wire is a baseline current, and wherein a controller detects a disturbance when the current flowing through the wire deviates from the baseline current by a predetermined amount.

13. The method as recited in claim 11, wherein the wire is adjacent a roof rail, and the wire spans substantially an entire length of the roof rail.

14. The method as recited in claim 13, wherein a clamp of the roof rack includes the magnet.

15. The method as recited in claim 14, wherein the roof rack is infinitely adjustable such that the clamp can be selectively attached to the roof rail at any point along the length of the roof rail, and wherein the deactivating step can be performed when the roof rail is attached at any point along the length of the roof rail.

16. The method as recited in claim 11, wherein the magnet is a rare earth magnet.

17. The method as recited in claim 11, wherein the moonroof includes a plurality of panels.

18. The method as recited in claim 17, wherein at least one of the panels is selectively moveable by a motor, and wherein a controller deactivates the motor when the disturbance is detected.

* * * * *